United States Patent
Boyd et al.

(10) Patent No.: US 9,608,729 B2
(45) Date of Patent: Mar. 28, 2017

(54) ETHERNET PASSIVE OPTICAL NETWORK OVER COAXIAL (EPOC) PHYSICAL LAYER LINK AND AUTO-NEGOTIATION

(71) Applicant: Avago Technologies General IP (Singapore) Pte. Ltd., Singapore (SG)

(72) Inventors: Edward Wayne Boyd, Petaluma, CA (US); Avi Kliger, Ramat Gan (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 334 days.

(21) Appl. No.: 14/022,972

(22) Filed: Sep. 10, 2013

(65) Prior Publication Data

US 2014/0072304 A1    Mar. 13, 2014

Related U.S. Application Data

(60) Provisional application No. 61/699,993, filed on Sep. 12, 2012, provisional application No. 61/702,113, filed on Sep. 17, 2012, provisional application No. 61/702,899, filed on Sep. 19, 2012.

(51) Int. Cl.
*H04B 10/27* (2013.01)
*H04Q 11/00* (2006.01)

(52) U.S. Cl.
CPC ......... *H04B 10/27* (2013.01); *H04Q 11/0067* (2013.01); *H04Q 2011/0088* (2013.01)

(58) Field of Classification Search
None
See application file for complete search history.

(56) References Cited

U.S. PATENT DOCUMENTS

| | | | | |
|---|---|---|---|---|
| 7,061,891 B1* | 6/2006 | Kilfoyle | ............... | H04B 7/2606 370/335 |
| 2009/0081944 A1* | 3/2009 | Yavuz | ................ | H04L 12/1881 455/3.01 |
| 2009/0297164 A1* | 12/2009 | Horiuchi | ...................... | 398/154 |
| 2013/0142515 A1* | 6/2013 | Chen et al. | .................... | 398/67 |
| 2013/0236185 A1* | 9/2013 | Fang et al. | .................... | 398/115 |

OTHER PUBLICATIONS

European Search Report for EP Patent Application No. EP13004417.5, European Patent Office, Munich, Germany, mailed on Jan. 14, 2014, 2 pages.
Laubach, M. et al., "Evaluation Criteria Beyond Objectives," IEEE 802.3 EPoC Study Group, accessed at http://grouper.ieee/org/groups/802/3/epoc/public/jul12/laubach_01_0712.pdf, accessed on Dec. 16, 2013, 23 pages.
Mukherjee, B., "EPoC (Ethernet PON Over Coax): Architecture, MPCP, and DBA" IEEE Draft, Mar. 2012, pp. 1-21, IEEE 802 Plenary Session, Piscataway, NJ.

* cited by examiner

*Primary Examiner* — Ayaz Sheikh
*Assistant Examiner* — Tarell Hampton
(74) *Attorney, Agent, or Firm* — Sterne, Kessler, Goldstein & Fox P.L.L.C.

(57) ABSTRACT

A PHY auto-negotiation and link up procedure for Ethernet Passive Optical Network Over Coax (EPOC) is provided. The procedure is compliant with the Ethernet Passive Optical Network (EPON) standard and can be used to bring an EPOC network to user traffic readiness. In addition, the procedure, or a variation thereof, can be used to enable periodic maintenance of the coaxial link of the EPOC network, thereby maintaining adequate communication conditions.

10 Claims, 6 Drawing Sheets

ETHERNET PASSIVE OPTICAL NETWORK OVER COAXIAL (EPOC) PHYSICAL LAYER LINK AND AUTO-NEGOTIATION

CROSS REFERENCE TO RELATED APPLICATIONS

This application claims the benefit of U.S. Provisional Patent Application No. 61/699,993, filed Sep. 12, 2012, U.S. Provisional Patent Application No. 61/702,113, filed Sep. 17, 2012, and U.S. Provisional Patent Application No. 61/702,899, filed Sep. 19, 2013, all of which are incorporated herein by reference.

TECHNICAL FIELD

This application relates generally to Ethernet.

BACKGROUND

A Passive Optical Network (PON) includes a shared optical fiber that and inexpensive optical splitters to divide the fiber into separate strands feeding individual subscribers. An Ethernet PON (EPON) is a PON based on the Ethernet standard. EPONs provide simple, easy-to-manage connectivity to Ethernet-based, IP equipment, both at customer premises and at the central office. As with other Gigabit Ethernet media, EPONs are well-suited to carry packetized traffic. An Ethernet Passive Optical Network Over Coax (EPOC) is a network that enables EPON connectivity over a coaxial network.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

I. Example Hybrid EPON-EPOC Network Architectures

Figure 1:
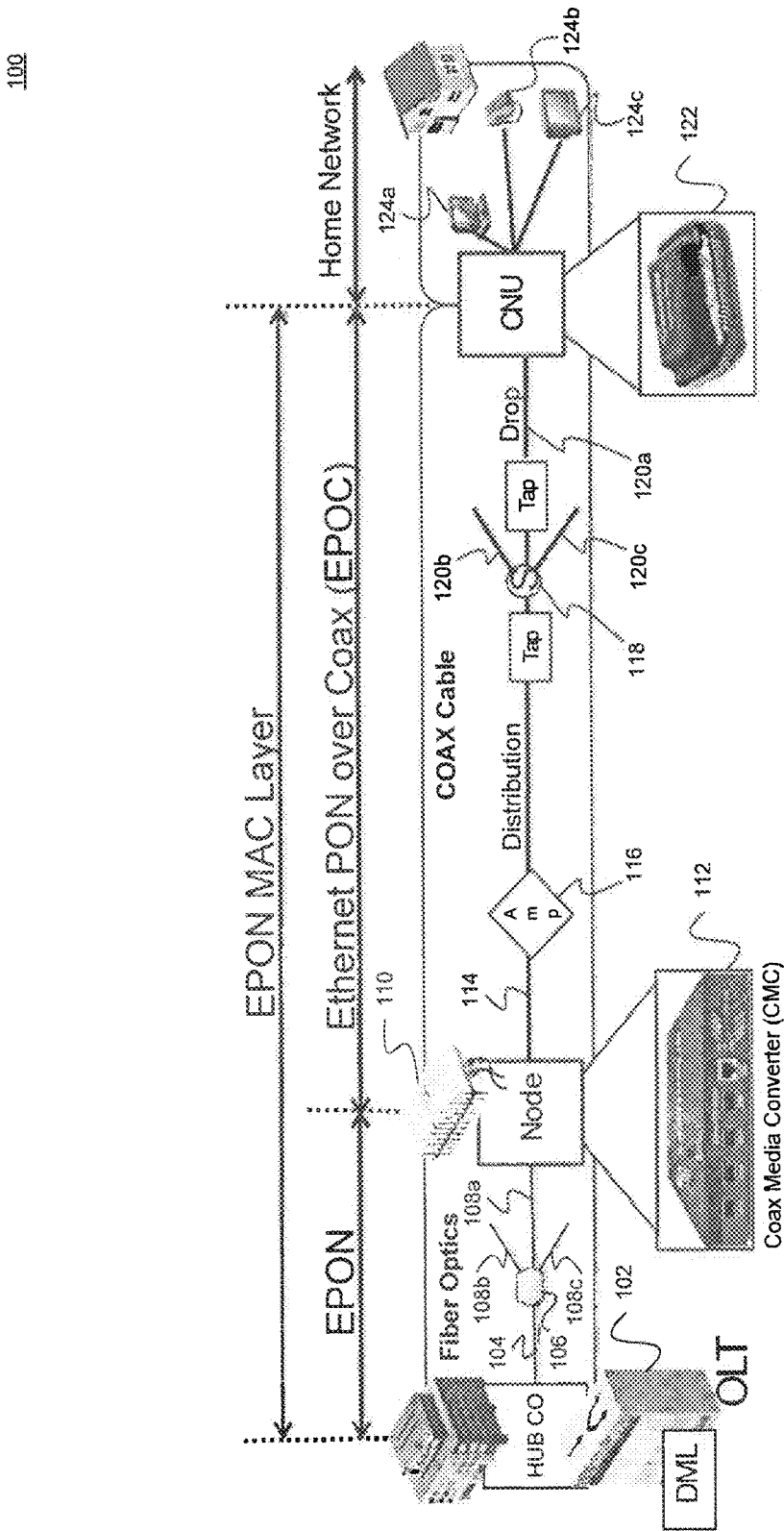
FIG. 1 illustrates an example hybrid Ethernet Passive Optical Network (EPON)-Ethernet Passive Optical Network Over Coax (EPOC) network architecture.

FIG. 1 illustrates an example hybrid Ethernet Passive Optical Network (EPON)-Ethernet Passive Optical Network Over Coax (EPOC) network architecture 100 according to an embodiment of the present disclosure. As shown in FIG. 1, example network architecture 100 includes an Optical Line Terminal (OLT) 102, an optional optical passive splitter 106, a communications node 110 including a coaxial media converter (CMC), an optional amplifier 116, an optional coaxial splitter 118, a coaxial network unit (CNU) 122, and a plurality of subscriber media devices 124.

OLT 102 sits at a central office (CO) of the network and is coupled to a fiber optic line 104. OLT 102 may implement a DOCSIS (Data Over Cable Service Interface Specification) Mediation Layer (DML) which allows OLT 102 to provide DOCSIS provisioning and management of network components (e.g., CMC, CMU, Optical Network Unit (ONU)). Additionally, OLT 102 implements an EPON Media Access Control (MAC) layer (e.g., IEEE 802.3ah).

Optionally, passive splitter 106 can be used to split fiber optic line 104 into a plurality of fiber optic lines 108. This allows multiple subscribers in different geographical areas to be served by the same OLT 102 in a point-to-multipoint topology.

Communications node 110 serves as a converter between the EPON side and the EPOC side of the network. Accordingly, node 110 is coupled from the EPON side of the network to a fiber optic line 108a, and from the EPOC side of the network to a coaxial cable 114. In an embodiment, communications node 110 includes a coaxial media converter (CMC) 112 that allows EPON to EPOC (and vice versa) conversion.

CMC 112 performs physical layer (PHY) conversion from EPON to EPOC, and vice versa. In an embodiment, CMC 112 includes a first interface (not shown in FIG. 1), coupled to fiber optic line 108, configured to receive a first optical signal from OLT 102 and generate a first bitstream having a first physical layer (PHY) encoding. In an embodiment, the first PHY encoding is EPON PHY encoding. CMC 112 also includes a PHY conversion module (not shown in FIG. 1), coupled to the first interface, configured to perform PHY layer conversion of the first bitstream to generate a second bitstream having a second PHY encoding. In an embodiment, the second PHY encoding is EPOC PHY encoding. Furthermore, CMC 112 includes a second interface (not shown in FIG. 1), coupled to the PHY conversion module and to coaxial cable 114, configured to generate a first radio frequency (RF) signal from the second bitstream and to transmit the first RF signal over coaxial cable 114.

In EPOC to EPON conversion (i.e., in upstream communication), the second interface of CMC 112 is configured to receive a second RF signal from CNU 122 and generate a third bitstream therefrom having the second PHY encoding (e.g., EPOC PHY encoding). The PHY conversion module of CMC 112 is configured to perform PHY layer conversion of the third bitstream to generate a fourth bitstream having the first PHY encoding (e.g., EPON PHY encoding). Subsequently, the first interface of CMC 112 is configured to generate a second optical signal from the fourth bitstream and to transmit the second optical signal to OLT 102 over fiber optic line 108.

Optionally, an amplifier 116 and a second splitter 118 can be placed in the path between communications node 110 and CNU 122. Amplifier 116 amplifies the RF signal over coaxial cable 114 before splitting by second splitter 118. Second splitter 118 splits coaxial cable 114 into a plurality of coaxial cables 120, to allow service over coaxial cables of several subscribers which can be within same or different geographic vicinities.

CNU 122 generally sits at the subscriber end of the network. In an embodiment, CNU 122 implements an EPON MAC layer, and thus terminates an end-to-end EPON MAC link with OLT 102. Accordingly, CMC 112 enables end-to-end provisioning, management, and Quality of Service (QoS) functions between OLT 102 and CNU 122. CNU 122 also provides multiple Ethernet interfaces that could range between 10 Mbps to 10 Gbps, to connect subscriber media devices 124 to the network. Additionally, CNU 122 enables gateway integration for various services, including VOIP (Voice-Over-IP), MoCA (Multimedia over Coax Alliance), HPNA (Home Phoneline Networking Alliance), Wi-Fi (Wi-Fi Alliance), etc. At the physical layer, CNU 122 may perform physical layer conversion from coaxial to another medium, while retaining the EPON MAC layer.

According to embodiments, EPON-EPOC conversion can occur anywhere in the path between OLT 102 and CNU 122 to provide various service configurations according to the services needed or infrastructure available to the network. For example, CMC 112, instead of being integrated within node 110, can be integrated within OLT 102, within amplifier 116, or in an Optical Network Unit (ONU) located between OLT 102 and CNU 122 (not shown in FIG. 1). When CMC 112 is implemented in OLT 102 at the CO hub, OLT 102 may be more aptly referred to as a Cable Line Terminal (CLT).

Figure 2:
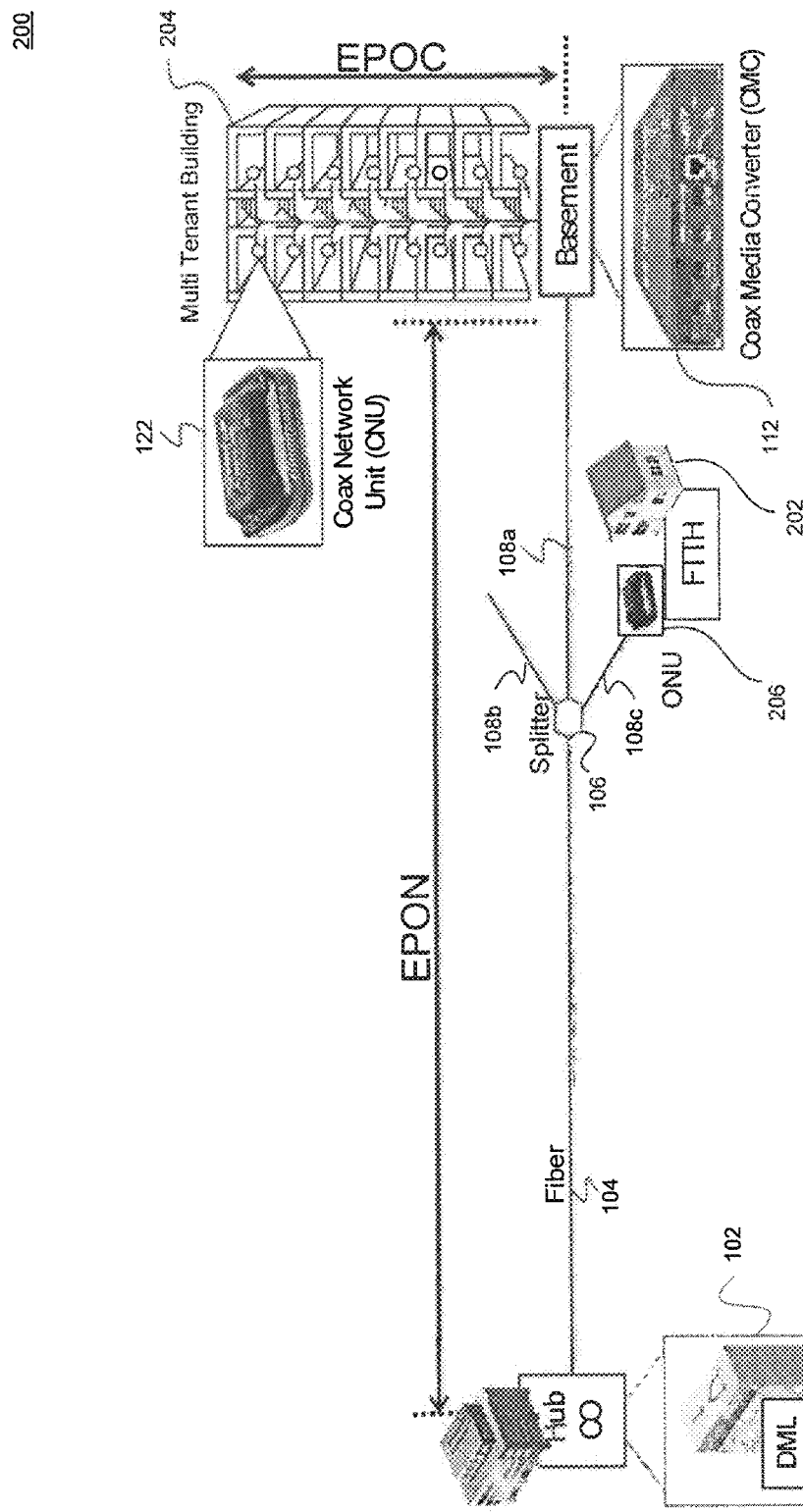
FIG. 2 illustrates another example hybrid EPON-EPOC network architecture.

FIG. 2 illustrates another example hybrid EPON-EPOC network architecture 200 according to an embodiment of the present disclosure. In particular, example network architecture 200 enables simultaneous FTTH (Fiber to the Home) and multi-tenant building EPOC service configurations.

Example network architecture 200 includes similar components as described above with reference to example network architecture 100, including an OLT 102 located in a CO hub, a passive splitter 106, a CMC 112, and one or more CNUs 122. OLT 102, splitter 106, CMC 112, and CNU 122 operate in the same manner described above with reference to FIG. 1.

CMC 112 sits, for example, in the basement of a multi-tenant building 204. As such, the EPON side of the network extends as far as possible to the subscriber, with the EPOC side of the network only providing short coaxial connections between CMC 112 and CNU units 122 located in individual apartments of multi-tenant building 204.

Additionally, example network architecture 200 includes on Optical Network Unit (ONU) 206. ONU 206 is coupled to OLT 102 through an all-fiber link, comprised of fiber lines 104 and 108c. ONU 206 enables FTTH service to a home 202, allowing fiber optic line 108c to reach the boundary of the living space of home 202 (e.g., a box on the outside wall of home 202).

Accordingly, example network architecture 200 enables an operator to service both ONUs and CNUs using the same OLT. This includes end-to-end provisioning, management, and QoS with a single interface for both fiber and coaxial subscribers. In addition, example network architecture 200 allows for the elimination of the conventional two-tiered management architecture, which uses media cells at the end user side to manage the subscribers and an OLT to manage the media cells.

II. Example Coaxial EPOC Link

Figure 3:
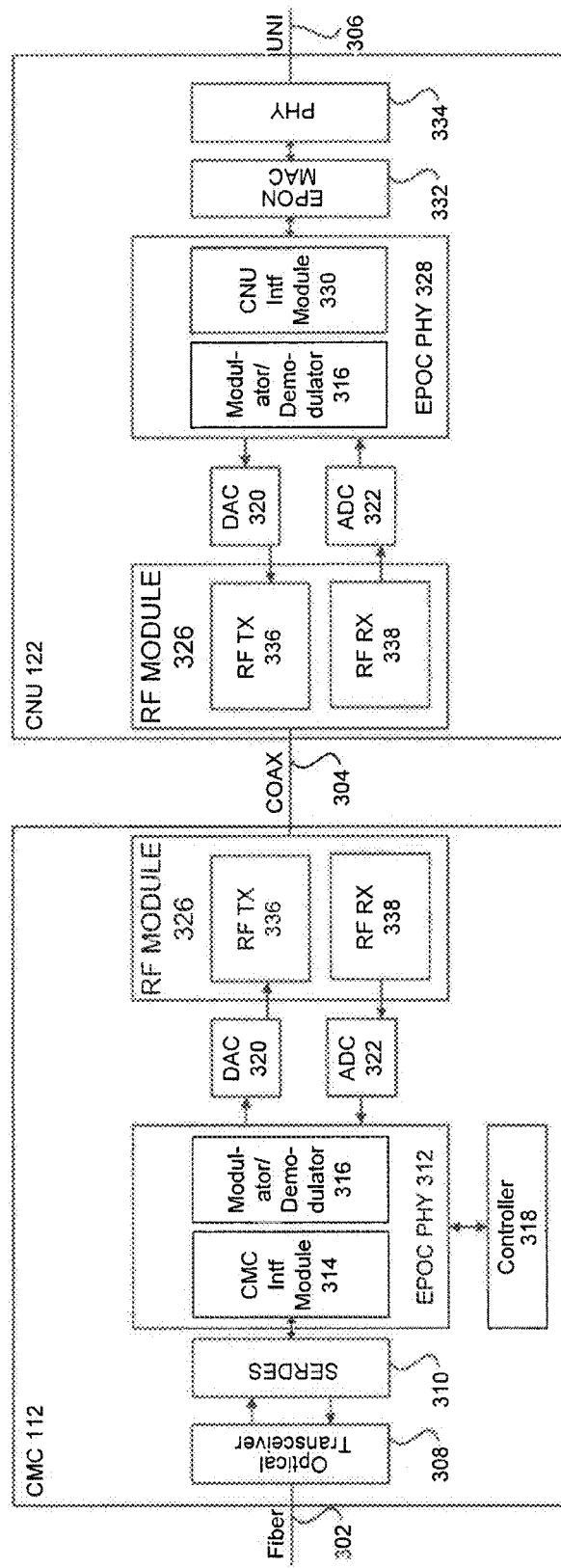
FIG. 3 illustrates an example EPOC portion of a hybrid EPON-EPOC network according to an embodiment of the present disclosure.

FIG. 3 illustrates an example implementation 300 of an EPOC portion of a hybrid EPON-EPOC network. Example implementation 300 may be an embodiment of the EPOC portion of example EPON-EPOC network 100, described in FIG. 1, or example EPON-EPOC network 200, described above in FIG. 2. As shown in FIG. 3, the EPOC portion includes an EPOC CMC 112 and an EPOC CNU 122, connected via a coaxial network 304.

EPOC CMC 112 includes an optical transceiver 308, a serializer-deserializer (SERDES) module 310, an EPOC PHY module 312, including, in an embodiment, a CMC interface module 314 and a modulator/demodulator 316, a controller module 318, an analog-to-digital converter (ADC) 322, digital-to-analog converters (DAC) 320, and an radio frequency (RF) module 326, including RF transmit (TX) circuitry 336 and RF receive (RX) circuitry 338.

Optical transceiver 308 may include a digital optical receiver configured to receive an optical signal over a fiber optic cable 302 coupled to CMC 112 and to produce an electrical data signal therefrom. Fiber optic cable 302 may be part of an EPON network that connects CMC 112 to an OLT, such as OLT 102. Optical transceiver 307 may also include a digital optical laser to produce an optical signal from an electrical data signal and to transmit the optical signal over fiber optic cable 302.

SERDES module 310 performs parallel-to-serial and serial-to-parallel conversion of data between optical transceiver 308 and EPOC PHY 312. Electrical data received from optical transceiver 308 is converted from serial to parallel for further processing by EPOC PHY 312. Likewise, electrical data from EPOC PHY 312 is converted from parallel to serial for transmission by optical transceiver 308.

EPOC PHY module 312, optionally with other modules of CMC 112, forms a two-way PHY conversion module. In the downstream direction (i.e., traffic to be transmitted to EPOC CNU 122), EPOC PHY 312 performs PHY level conversion from EPON PHY to coaxial PHY and spectrum shaping of downstream traffic. For example, CMC interface module 314 may perform line encoding functions, Forward Error Correction (FEC) functions, and framing functions to convert EPON PHY encoded data into coaxial PHY encoded data. Modulator/demodulator 316 may modulate the data received from SERDES 310 using either a single carrier or multicarrier modulation technique (e.g., orthogonal frequency division multiple, orthogonal frequency division multiple access, sub-band division multiplexing, etc.). When using a multicarrier technique modulator/demodulator 316 can perform multicarrier functions, including determining sub-carriers for downstream transmission, determining the width and frequencies of the sub-carriers, selecting the modulation order for downstream transmission, and dividing downstream traffic into multiple streams each for transmission onto a respective sub-carrier of the sub-carriers. In the upstream direction (i.e., traffic received from EPOC CNU 112), EPOC PHY 312 performs traffic assembly and PHY level conversion from coaxial PHY to EPON PHY. For example, modulator/demodulator 316 may assemble streams received over multiple sub-carriers to generate a single stream. Then, CMC interface module 314 may perform line encoding functions, FEC functions, and framing functions to convert coaxial PHY encoded data into EPON PHY encoded data.

Controller module 318 provides software configuration, management, and control of EPOC PHY 312, including CMC interface module 314 and modulator/demodulator 316. In addition, controller module 318 registers CMC 112 with the OLT servicing CMC 112. In an embodiment, controller module 318 is an ONU chip, which includes an EPON MAC module.

DAC 320 and ADC 322 sit in the data path between EPOC PHY 312 and RF module 326, and provide digital-to-analog and analog-to-digital data conversion, respectively, between EPOC PHY 312 and RF module 326.

RF module 326 allows CMC 112 to transmit/receive RF signals over coaxial network 304. In other embodiments, RF module 326 may be external to CMC 112. RF TX circuitry 336 includes RF transmitter and associated circuitry (e.g., mixers, frequency synthesizer, voltage controlled oscillator (VCO), phase locked loop (PLL), power amplifier (PA), analog filters, matching networks, etc.). RF RX circuitry 338 includes RF receiver and associated circuitry (e.g., mixers, frequency synthesizer, VCO, PLL, low-noise amplifier (LNA), analog filters, etc.).

EPOC CNU 122 includes RF module 326, including RF TX circuitry 336 and RF RX circuitry 338, DAC 320, ADC 322, an EPOC PHY module 328, including modulator/demodulator 316 and a CNU interface module 330, an EPOC MAC module 332, and a PHY module 334.

RF module 326, DAC 320, ADC 322, and modulator/demodulator 316 may be as described above with respect to EPOC CMC 112. Accordingly, their operation in processing downstream traffic (i.e., traffic received from CMC 112) and upstream traffic (i.e., traffic to be transmitted to CMC 112), which should be apparent to a person of skill in the art based on the teachings herein, is omitted.

CNU interface module 330 provides an interface between modulator/demodulator 316 and EPON MAC 332. As such, CNU Interface 330 may perform coaxial PHY level decoding functions, including line decoding and FEC decoding. EPON MAC module 332 implements an EPON MAC layer, including the ability to receive and process EPON Operation, Administration and Maintenance (OAM) messages, which may be sent by an OLT and forwarded by CMC 112 to CNU 122. In addition, EPON MAC 332 interfaces with a PHY module 334, which may implement an Ethernet PHY layer. PHY module 334 enables physical transmission over a user-network interface (UNI) 306 (e.g., Ethernet cable) to a connected user equipment.

It should be noted that, in an alternate network configuration, CMC 112 can be implemented within an OLT at the CO hub, such as within OLT 102 shown in FIG. 1. In such an instance, it will be apparent to one of ordinary skill in the art that the implementation of CMC 112, shown in FIG. 3, can be modified to accommodate such a change. As noted above, when CMC 112 is implemented in an OLT, the OLT may be more aptly referred to as a Cable Line Terminal (CLT).

III. EPOC PHY Auto-Negotiation and Link Up

The EPON standard defines an ONU registration procedure for pure EPON networks. This procedure is a MAC-level only procedure and thus is not sufficient to enable proper operation of an EPOC network. Specifically, the coaxial portion of an EPOC network requires an auto-negotiation to determine the coaxial link spectrum, link bandwidth, and power level, and to establish precise timing between the CMC (or CLT) and the CNU. For example, in an EPON network, a link is designed to work at 1 Gbps or 10 Gbps. In an EPOC network, the coaxial link will likely be limited to a lower bandwidth, which needs to be discovered before the link can be used. In addition, this auto-negotiation must not violate the EPON standard, which governs MAC-level interaction.

Figure 4:
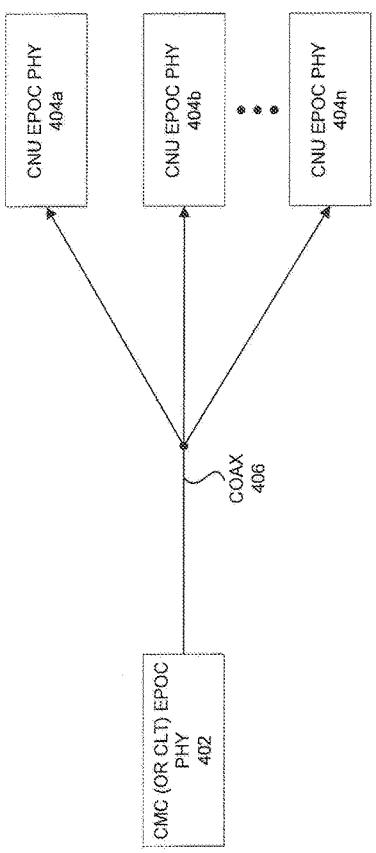
FIG. 4 illustrates an exemplary EPOC network.

In the following, a PHY auto-negotiation and link up procedure for an exemplary EPOC network 400 illustrated in FIG. 4 is described. The PHY auto-negotiation and link up procedure is compliant with the EPON standard and is performed between a CMC (or CLT) EPOC PHY 402 and CNU EPOC PHYs 404 over (at least) a shared coaxial medium 406. The PHY auto-negotiation and link up procedure can be further used to enable periodic maintenance of the links between the CMC (or CLT) EPOC PHY 402 and the CNU EPOC PHYs 404. CMC EPOC PHY 402 can be implemented in a CMC similar to CMC 112, and one or more of CNU EPOC PHYs 404 can be implemented in CNUs similar to CNU 122 described above with reference to FIG. 3.

Figure 5:
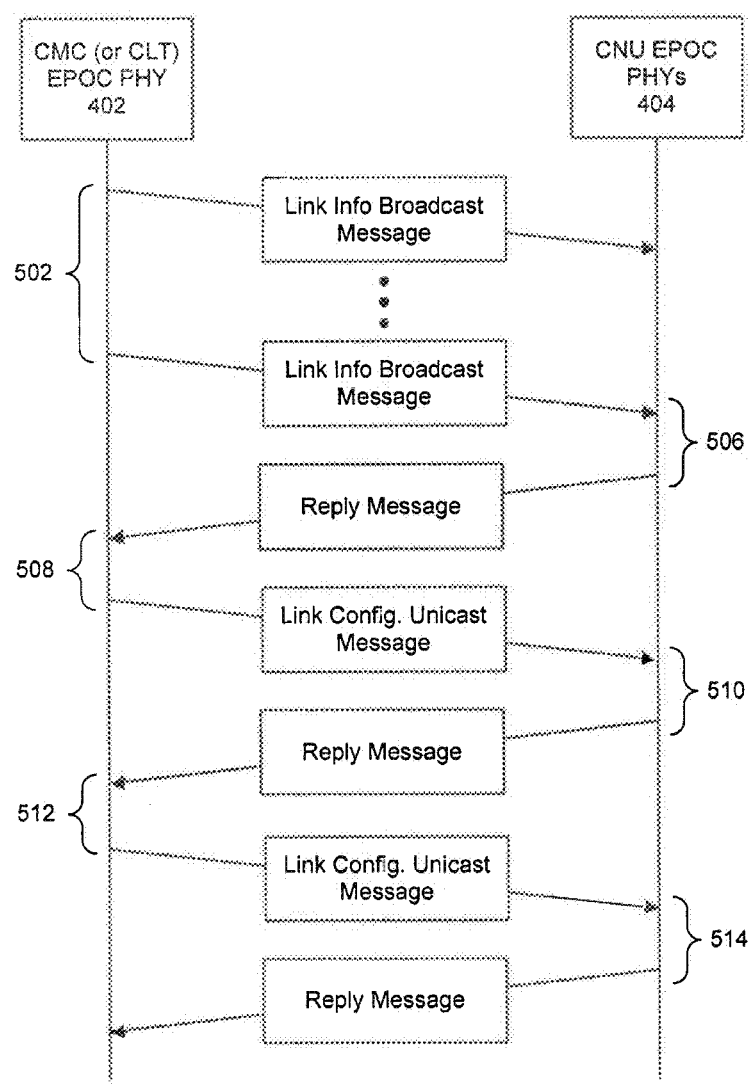
FIG. 5 illustrates an example of a PHY auto-negotiation and link up procedure according to an embodiment of the present disclosure.

Referring now to FIG. 5, an example of the PHY auto-negotiation and link up procedure 500 is illustrated. As shown in FIG. 5, the procedure 500 begins at step 502, which includes the CMC (or CLT) EPOC PHY 402 periodically broadcasting a link info message over the coaxial medium 406 to the CNU EPOC PHYs 404. As mentioned above, data is generally transmitted over an EPOC network using a multi-carrier or multi-channel transmission technique, such as OFDM. The CMC (or CLT) EPOC PHY 402 is configured to broadcast the link info message over one or more carriers or channels, collectively referred to as the PHY link channel, of the EPOC transmission spectrum. This PHY link channel is dedicated to carrying PHY auto-negotiation and link information (and no MAC-level data) to limit interference with the MAC-level operation of the network.

The link info broadcast message can include several pieces of link information. For example, the link info broadcast message can provide link information regarding the modulation mode used and the duplexing mode used (e.g. time division duplexing or frequency division duplexing). If the modulation used is multicarrier modulation, the link information can further include the configuration of sub-carriers in the EPOC spectrum used to carry MAC-level data and control messages in the upstream and/or downstream direction. This configuration information can include all (or some) of the information required for the CNU PHY to be able to receive MAC-level data and control messages. For example, the configuration information can include the location in the EPOC spectrum of active downstream and upstream sub-bands, the total number of sub-bands, which sub-bands carry data and/or pilots, and the sub-bands respective modulation orders, as well as the location of any inactive sub-bands in the EPOC spectrum. The link info broadcast message can further provide possible PHY configurations and capabilities, including an interleaver depth and a forward error correction type and size. It may also contains information required for the CNU to transmit messages over the upstream PHY link channel. In addition, where OFDM is used to encode data transmitted in either the downstream or upstream direction, the configuration information can include, in addition to the parameters already mentioned, the number of sub-bands (or sub-carriers) per OFDM symbol, the center frequency of the sub-bands that make up OFDM symbols, and the size of any cyclic prefix added to OFDM symbols. In addition, when the PHY link channel is used to convey timing information, it can carry time stamp information. In addition, the PHY link channel can be used to carry power management messages. In this case, the PHY link channel can carry information on wake-up times and modes, or moving into standby or sleeping mode, for each of the CNUs using unicast or broadcast messages.

In step 506, unlinked ones of the CNU EPOC PHYs 404 are configured to "hunt" in the EPOC spectrum to locate that PHY link channel and receive the link info broadcast message transmitted by the CMC (or CLT) EPOC PHY 402. The unlinked CNU EPOC PHYs 404 can "hunt" in the EPOC spectrum, for example, by looking for a predetermined preamble or bit pattern transmitted by the CMC (or CLT) EPOC PHY 402 at various frequencies to identify the PHY link channel.

After unlinked ones of the CNU EPOC PHYs 404 locate the PHY link channel and receive/decode the link info broadcast message from the CMC (or CLT) EPOC PHY 402, the unlinked ones of the CNU EPOC PHYs 404 can respond to the link info broadcast message using, for example, an echo protocol to perform auto negotiation and link up. An echo protocol can be used to provide a mechanism to share access to the coaxial medium 406 in the upstream direction between the unlinked ones of the CNU EPOC PHYs 404. For example, in the event that two or more unlinked ones of the CNU EPOC PHYs 404 attempt to respond to the link info broadcast message at the same time, the unlinked ones of the CNU EPOC PHYs 404 can implement random back off times to resolve the contention.

Assuming no contention, at step 506 an unlinked one of the CNU EPOC PHYs 404 will respond to the link info broadcast message by transmitting a reply message (e.g., an "echo" or copy of the link info broadcast message) upstream to the CMC (or CLT) EPOC PHY 402. The reply message includes an address of the unlinked one of the CNU EPOC PHYs 404. The address of the unlinked one of the CNU EPOC PHYs 404 can be the Ethernet MAC address of its associated CNU (or at least a portion of the Ethernet MAC address) or some other configurable address, for example. The reply message may also include other information (e.g. in the case where multiple PHY link channels in the downstream are used, the "echo" may also include the downstream channel ID of the particular PHY link channel that the unlinked one of the CNU EPOC PHYs 404 detected).

At step 508, the CMC (or CLT) EPOC PHY 402 receives and processes the reply message from the unlinked one of the CNU EPOC PHYs 404 and, using the address provided in the received message, sends a link configuration unicast message back to the unlinked one of the CNU EPOC PHYs 404. The link configuration unicast message can include additional configuration settings to adjust, for example, the transmit power and a transmit delay of the unlinked one of the CNU EPOC PHYs 404.

More specifically, for the transmit delay, the CMC (or CLT) EPOC PHY 402 can monitor the time it takes from the last link info broadcast message it sends to the time it takes to receive the reply message from the unlinked one of the CNU EPOC PHYs 404 and, based on this time, determine an adjustment to the transmit delay in the unlinked one of the CNU EPOC PHYs 404. The adjustment can be determined to align upstream symbol transmissions from the unlinked one of the CNU EPOC PHYs 404 with the upstream symbol transmissions of the other CNU EPOC PHYs 404 operating on the network. This adjustment value can be provided as a configuration setting in the link configuration unicast message sent by the CMC (or CLT) EPOC PHY 402 at step 508.

Similarly, for the transmit power setting, the CMC (or CLT) EPOC PHY 402 can monitor the power level of the reply message received from the unlinked one of the CNU EPOC PHYs 404 and, based on this power level, determine an adjustment to the transmit power in the unlinked one of the CNU EPOC PHYs 404 to further optimize the data rate and/or bit-error rate of the shared upstream channel. Again, this adjustment value can be provided as a configuration setting in the link configuration unicast message sent by the CMC (or CLT) EPOC PHY 402 at step 508.

At step 510, the unlinked one of the CNU EPOC PHYs 404 receives and decodes the link configuration unicast message and makes adjustments to, for example, its transmit power level and transmit delay based on the values in the decoded message. In addition, the unlinked one of the CNU EPOC PHYs 404 is configured to respond by transmitting a reply message (e.g., an "echo" or copy of the link configuration unicast message or another appropriate response) upstream to the CMC (or CLT) EPOC PHY 402. The reply message includes status information of the unlinked one of the CNU EPOC PHYs 404. This status information can include, for example, an error indicator or an indication of the power level of the messages the unlinked one of the CNU EPOC PHYs 404 is receiving from the CMC (or CLT) EPOC PHY 402.

At step 512, the CMC (or CLT) EPOC PHY 402 receives and processes the reply message and status information sent by the unlinked one of the CNU EPOC PHYs 404 and responds by transmitting another link configuration unicast message. This link configuration unicast message can inform the unlinked one of the CNU EPOC PHYs 404 to transition to a linked state. For example, if the power level and symbol timing of the reply message to the link configuration unicast message the CMC (or CLT) EPOC PHY 402 receives at step 512 from the unlinked one of the CNU EPOC PHYs 404 are acceptable, the CNU EPOC PHYs 404 can send the link configuration unicast message to inform the unlinked one of the CNU EPOC PHYs 404 to transition to a linked state. Otherwise, if the power level and symbol timing are not acceptable, CMC (or CLT) EPOC PHY 402 can go back to step 508 and send another link configuration unicast message to the unlinked one of the CNU EPOC PHYs 404 to adjust the transmit power and/or the transmit delay of the unlinked one of the CNU EPOC PHYs 404.

Assuming that the CMC (or CLT) EPOC PHY 402 sent a link configuration unicast message to the unlinked one of the CNU EPOC PHYs 404 to inform it to transition to a linked state at step 512, at step 514 the unlinked one of the CNU EPOC PHYs 404 can respond to this message by transmitting a reply message (e.g., an "echo" or copy of the link configuration unicast message it just received) upstream to the CMC (or CLT) EPOC PHY 402. The reply message includes status information indicating that the unlinked one of the CNU EPOC PHYs 404 is now linked and ready to transmit and receive EPON MAC-level messages.

It should be noted that even after a CNU EPOC PHY has been linked, a CMC (or CLT) EPOC PHY can continue to transmit link configuration unicast messages to the linked CNU EPOC PHY (and in response receive a reply message from the linked CNU EPOC PHY) to determine if any adjustments need to be made to the configuration settings of the linked CNU EPOC PHY. For example, after having been linked, adjustments can be made to the transmit power and/or transmit delay of the CNU EPOC PHY.

IV. Example Computer System Environment

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 6:
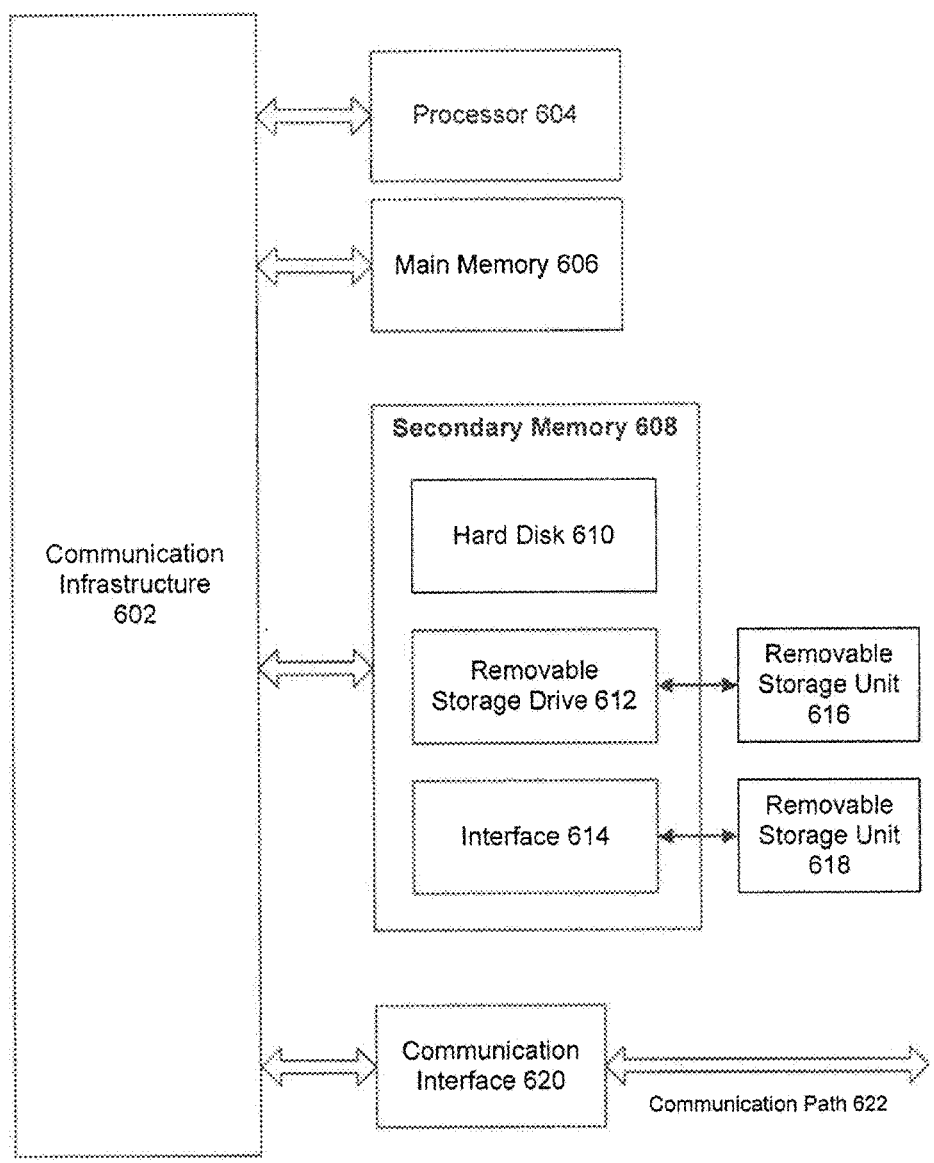
FIG. 6 illustrates an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 600 is shown in FIG. 6. Modules depicted in FIGS. 1-4 may execute on one or more computer systems 600. Furthermore, each of the steps of the processes depicted in FIG. 5 can be implemented on one or more computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCM-CIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

V. Conclusion

Embodiments have been described above with the aid of functional building blocks illustrating implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for performing physical layer auto-negotiation and link up in an Ethernet Passive Optical Network over Coaxial (EPOC) network, the method comprising:
    transmitting a link info broadcast message over a physical layer (PHY) link channel of the EPOC network, wherein the link info broadcast message includes a bit pattern that allows an unlinked coaxial network unit (CNU) to locate the PHY link channel by hunting for the bit pattern among a plurality of channels of a transmission spectrum of the EPOC network;
    transmitting a first link configuration unicast message over the PHY link channel of the EPOC network in response to receiving a reply message to the link info broadcast message; and
    transmitting a second link configuration unicast message over the PHY link channel of the EPOC network in response to receiving a reply message to the first link configuration unicast message,
    wherein the PHY link channel carries no media access control level content.

2. The method of claim 1, wherein the link info broadcast message is broadcast to a plurality of coaxial network units (CNUs).

3. The method of claim 1, further comprising:
    receiving the reply message to the link info broadcast message over the EPOC network from the unlinked CNU.

4. The method of claim 3, wherein the reply message to the link info broadcast message includes an address of the unlinked CNU.

5. The method of claim 3, further comprising:
    determining an adjustment to a transmit power level of the unlinked CNU based on the reply message to the link info broadcast message.

6. The method of claim 3, further comprising:
    determining an adjustment to a transmit delay of the unlinked CNU based on a time between transmitting the link info broadcast message and receiving the reply message to the link info broadcast message.

7. The method of claim 1, wherein the first link configuration unicast message includes configuration settings to adjust a transmit power and a transmit delay of the unlinked CNU.

8. The method of claim 1, wherein the second link configuration unicast message informs the unlinked CNU to transition to a linked state.

9. The method of claim 1, wherein the second link configuration unicast message informs the unlinked CNU to transition to a linked state based on a transmission power level and a transmission symbol timing of the unlinked CNU.

10. The method of claim 1, wherein the PHY link channel is dedicated to carrying PHY auto-negotiation and link information.

* * * * *